(12) United States Patent
Love et al.

(10) Patent No.: US 9,344,259 B2
(45) Date of Patent: May 17, 2016

(54) CONTROL CHANNEL PROVISIONING AND SIGNALING

(75) Inventors: Robert Tristan Love, Barrington, IL (US); Jialing Liu, Palatine, IL (US); Vijay Nangia, Algonquin, IL (US); Ravikiran Nory, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 664 days.

(21) Appl. No.: 12/435,145

(22) Filed: May 4, 2009

(65) Prior Publication Data

US 2010/0279628 A1 Nov. 4, 2010

(51) Int. Cl.
*H04W 4/00* (2009.01)
*H04L 5/00* (2006.01)

(52) U.S. Cl.
CPC ............. *H04L 5/0091* (2013.01); *H04L 5/003* (2013.01)

(58) Field of Classification Search
CPC ........ H04B 1/40; H04W 48/04; H04W 52/02; H03G 3/3042; H03M 13/1102
USPC ................... 455/466; 370/328, 329, 337, 314
See application file for complete search history.

(56) References Cited

U.S. PATENT DOCUMENTS

| 8,238,818 | B2 | 8/2012 | Karabinis et al. |
| 8,401,542 | B2 | 3/2013 | Chung et al. |
| 2006/0274712 | A1 | 12/2006 | Malladi et al. |
| 2008/0310359 | A1 | 12/2008 | McBeath et al. |
| 2010/0091678 | A1 | 4/2010 | Chen et al. |
| 2010/0142455 | A1 | 6/2010 | Imamura |
| 2010/0227569 | A1 | 9/2010 | Bala et al. |
| 2010/0254329 | A1 | 10/2010 | Pan et al. |
| 2011/0194501 | A1 | 8/2011 | Chung et al. |

(Continued)

FOREIGN PATENT DOCUMENTS

| CN | 101099305 A | 1/2008 |
| EP | 1944896 A1 | 7/2008 |

(Continued)

OTHER PUBLICATIONS

Patent Cooperation Treaty, "PCT Search Report and Written Opinion of the International Searching Authority" for International Application No. PCT/US2010/026500 Dec. 16, 2010, 11 pages.

(Continued)

*Primary Examiner* — Diana J Cheng
(74) *Attorney, Agent, or Firm* — Faegre Baker Daniels LLP (57) ABSTRACT

There is provided a communication device and a base unit, and methods thereof, for determining control information. The communication device receives a control channel message associated with the communication device in a control region on a first carrier from a base unit. The communication device also determines a set of resources in a search space within the control region, attempts to decode the set of resources in the search space for the control channel message, and determines control information from the decoded control channel message. The base unit generates a control channel message comprising control information associated with the communication device, determines a set of resources in a search space within a control region, selects a subset of resources within the determined set of resources for transmitting the control channel message, and transmits the control channel message on the selected resources in the control region on a first carrier.

24 Claims, 5 Drawing Sheets

(56) References Cited

U.S. PATENT DOCUMENTS

| | | | |
|---|---|---|---|
| 2011/0201333 A1 | 8/2011 | Kwon et al. | |
| 2011/0267978 A1 | 11/2011 | Etemad | |
| 2012/0009923 A1 | 1/2012 | Chen et al. | |
| 2012/0208583 A1 | 8/2012 | Chung et al. | |
| 2013/0010619 A1 | 1/2013 | Fong et al. | |

FOREIGN PATENT DOCUMENTS

| | | |
|---|---|---|
| KR | 1020090033001 | 4/2009 |
| WO | 2008083804 A2 | 7/2008 |
| WO | 2008157692 A2 | 12/2008 |
| WO | 2011102686 A2 | 8/2011 |

OTHER PUBLICATIONS

Nory et. al., "Multi-Carrier Control Signaling in Wireless Communication System" U.S. Appl. No. 12/709,476, filed Feb. 20, 2010, 29 pages.
3GPP TSG RAN WG1 Meeting #59bis; "Further Discussion on PDCCH with Cross Carrier Operation"; Valencia, Spain, Jan. 18-22, 2010; R1-100361; 6 pages.
3GPP TSG RAN WG1 Meeting #58; "Carrier Indication for Carrier Aggregation"; Shenzhen, China, Aug. 24-Aug. 28, 2009; R1-093296; 4 pages.
Motorola, "PDCCH Search Space Assignment Hashing Function", 3GPP TSG RAN1 #52bis R1-081672, Mar. 31-Apr. 4, 2008, pp. 1-7, vol. 6.1.3, Shenzhen, China.
Motorola, "PDCCH Search Space Assignment Hashing Function", 3GPP TSG RAN1 #52bis, R1-081289, Mar. 31-Apr. 4, 2008, pp. 1-4, vol. 6.1.3, Shenzhen, China.
Motorola, "PDCCH Search Space Assignment Hashing Function", 3GPP TSG RAN1 #52bis, R1-081586, Mar. 31-Apr. 4, 2008, pp. 1-6, vol. 6.1.3, Shenzhen, China.
Motorola, "E-UTRA DL L1/L2 Control Channel Design", 3GPP TSG RAN1 #48; St. Louis, USA; Feb. 12-16, 2007; R1-070787.
Motorola, "Search Space Definition for L1/L2 Control Channels", 3GPP TSG RAN1 #50; Athens, Greece; Aug. 20-24, 2007; R1-073373.
Ericsson, Qualcomm, Nokia, TI, NTT Docomo, Motorola, Panasonic, Siemens, Samsung, Nortel, ZTE, LGE Huawei, Alcatel-Lucent, Freescale, "Way Forward on Downlink Control Signaling", Agenda Item 6.9.2; Feb. 14, 2007; R1-071223.
Motorola U.S. Appl. No. 12/405,046, filed Mar. 16, 2009.
TSG-RAN WG1 #53bis; Warsaw, Poland, Jun. 30-Jul. 4, 2008; Carrier Aggregation in LTE-Advanced; Ericsson R1-082468.
R1-082380; Jul. 2008; Technical Scope for LTE-Advanced Evolution; ZTE Corporation.
3GPP TSG RAN WG1 Meeting #54bis; Prague, Czech Republic, Sep. 29-Oct. 3, 2008; DL Layered Control Signal Structure in LTE-Advanced; R1-083681.
3GPP TS 36.212 V8.5.0 (Dec. 2008) 3rd Generation Partnership Project; Technical Specification Group Radio Access Network; Evolved Universal Terrestrial Radio Access (E-UTRA); Multiplexing and Channel Coding (Release 8); Section 5.3.3.1.
3GPP TS36.213 V8.5.0 (Dec. 2008) 3rd Generation Partnership Project; Technical Specification Group Radio Access Network; Evolved Universal Terrestrial Radio Access (E-UTRA); Physical Layer Procedures (Release 8); Section 6.2.
Hashing Functions Performance in Packet Classification; Mahmood Ahmadi and Stephan Wong; Computer Engineering Laboratory; Faculty of Electrical Engineering, Mathematics and Computer Science; Delft University of Technology.
"PDCCH blind decoding—Outcome of Offline Discussions, R1-081101", Internet Citation, Feb. 11, 2008, pp. 1-7, XP002534832.
Philips: "Analysis of Search Space Design for PDCCH Blind Decoding" 3GPP Draft; R1-081504, 3rd Generation Partnership Project, Mobile Competence Centre, Mar. 27, 2008, vol. RAN WG1, XP050109920, Sophia-Antipolis Cedex, France.

Motorola, "Search Space Definition: Reduced PDCCH Blind Detection for Split PDCCH Search Space", 3GPP Draft; R1-080079—Split Search Space Reduced PDCCH Blind Detection, 3rd Generation Partnership Project, Mobile Competence Centre, Jan. 9, 2008, vol. RAN WG1, XP050108617, Sophia-Antipolis Cedex, France.
PCT "Notification of Transmittal of the International Search Report and the Written Opinion of the International Searching Authority, or the Declaration", Aug. 26, 2010, pp. 1-15, PCT/US2010/033079, European Patent Office.
Philips, "Analysis of Search Space Design for PDCCH Blind Decoding", 3GPP Draft; R1-081504, 3rd Generation Partnership Project, Mobile Competence Centre, XP050109920, Mar. 27, 2008, vol. RAN WG1, Shenzhen, China.
Motorola, "Search Space Definition: Reduced PDCCH Blind Detection for Split PDCCH Search Space", 3GPP Draft; R1-080079—Split Search space for Reduced PDCCH Blind Detection, 3rd Generation Partnership Project, Mobile Competence Centre; XP050108617, Jan. 9, 2008, vol. RAN WG1, Sevilla, Spain.
Patent Cooperation Treaty, PCT Notification of Transmittal of the International Search Report and the Written Opinion of the International Searching Authority, or the Declaration; Aug. 26, 2010, pp. 1-15, PCT/US2010/033079, European Patent Office, Rijwsijk.
"PDCCH Blind Decoding—Outcome of Offline Discussions", Internet Citation, Feb. 11, 2008, pp. 1-7, R1-081101, XP002534832.
Patent Cooperation Treaty, "PCT Search Report and Written Opinion of the International Searching Authority" for International Application No. PCT/US2011/025155 Aug. 1, 2011, 11 pages.
3GPP TSG RAN WG1 #59, R1-094829 "PDCCH Monitoring for LTE-A" Motorola, Jeju, Korea, Nov. 9-13, 2009, 4 pages.
3GPP TSG RAN2 #67bis, R2-095576 "Component Carrier Configuration/Activation for Carrier Aggregation" NEC, Miyazaki, Japan, Oct. 12-16, 2009, 4 pages.
3GPP TSG RAN WG2 #68, R2-096752 "Activation and Deactivation of Component Carriers" Ericsson, ST-Ericsson, Jeju, Korea, Oct. 9-13, 2009, 4 pages.
3GPP TSG RAN WG1 #59, R1-094830 "PDCCH Design for Cross-Carrier Operation Using CIF" Motorola, Jeju, Korea, Nov. 9-13, 2009, 4 pages.
3GPP TSG RAN WG1 #69, R2-101537 "UE Assignment Methods During CIF Configuraiton" NTT DOCOMO, Inc., San Francisco, USA Feb. 22-26, 2010, 3 pages.
3GPP TSG RAN WG1 #69, R2-101534 "DL and UL CC Linkage for Carrier Aggregation" NTT DOCOMO, Inc., San Francisco, USA Feb. 22-26, 2010, 6 pages.
United States Patent & Trademark Office "Non-Final Office Action" for U.S. Appl. No. 12/405,406 dated Sep. 29, 2011, 19 pages.
United States Patent & Trademark Office "Non-Final Office Action" for U.S. Appl. No. 12/405,406 dated Sep. 14, 2012, 19 pages.
3GPP TSG-RAN1 #56bis, R1-091503 "Anchor component carrier and preferred control signal structure" Fujitsu, Seoul, ROK; Jan. 23-27, 2009, 5 pages.
3GPP TSG RAN WG1 #52bis, R1-081212 "UE-specific search space" Samsung; Shenzhen, China; Mar. 31-Apr. 4, 2008; 7 pages.
United States Patent & Trademark Office "Non-Final Office Action" for U.S. Appl. No. 12/405,406 dated Sep. 27, 2013, 22 pages.
3GPP TSG RAN WG1, #51bis, "Reducing the Decoding complexity of the PDCCH", R1-080303, Jan. 14-18, 2008, 8 pages.
Korean Intellectual Property Office, "KIPO's Notice of Preliminary Rejection", Korean Pat. Appln. No. 10-2011-7026269, Apr. 2, 2013.
Japanese Patent Office, "First Office Action" Japanese Pat. Appln. No. 2012-508761, Feb. 19, 2013, 9 pages.
Instituto Mexicano de la Propiedad Industrial, "Rejection", Mexican Pat. Appln. No. MX/a/2011/011462, Feb. 5, 2013, 4 pages.
3GPP TSG RAN WG1 #56bis, R1-091168 "PDCCH coding and mapping for carrier aggregation" Panasonic; Seoul, Korea; Mar. 23-27, 2009, 5 pages.
United States Patent & Trademark Office "Non-Final Office Action" for U.S. Appl. No. 12/709,476 dated Mar. 15, 2013, 14 pages.
United States Patent & Trademark Office "Final Rejection" for U.S. Appl. No. 12/709,476 dated Aug. 26, 2013, 19 pages.
The State Intellectual Property Office of the People's Republic of China, "Notification of the Second Office Action" for Patent Application No. 201080019633.7 dated Jul. 22, 2014, 5 pages.

CONTROL CHANNEL PROVISIONING AND SIGNALING

CROSS REFERENCE TO RELATED APPLICATIONS

The present application is related to U.S. Provisional Application No. 60/945,212, filed on Jun. 20, 2007, and commonly assigned U.S. Non-provisional application Ser. No. 12/131,170, filed on Jun. 2, 2008, from which benefits under 35 USC 120 are hereby claimed and the contents of which are incorporated herein by reference.

FIELD OF THE INVENTION

The present invention relates generally to the field of wireless communication and more particularly to control channel management for wireless communication base units and devices.

BACKGROUND OF THE INVENTION

Typically in communication systems, assigned channels are employed for sending data and also for control signaling or messaging of the system. Control signals or messages may be transmitted in control channels (CCHs) and are used for both the forward link transmissions, also known as the downlink transmission, from a network or base station to user equipment, and reverse link transmission, also known as uplink transmissions, from the user equipment to the network or base station. Here control signaling refers to reference signal or pilot, or synchronization signal transmissions (etc.) while control messaging refers to transmission of system information (including network and user equipment configuration information), scheduling and resource assignment information, Hybrid ARQ information (redundancy version information, new data indicator, Hybrid ARQ process ID information), power control information, paging information, random access response information, etc. In systems, such as Long Term Evolution (LTE) of UTRA, where the downlink control channel is composed of a single decodable element (called Control Channel Element (CCE)), or an aggregation of decodable elements (called Control Channel Elements (CCEs)), a user equipment must identify from a large group of CCEs the subset of CCEs intended for the particular user equipment. The subset of CCEs intended for a particular user equipment to monitor or attempt to decode at a particular CCE aggregation level, L, (e.g., L=1, 2, 4 or 8 CCEs) is called the set of resources for that user equipment at the particular CCE aggregation level, L. The set of resources for a user equipment contains one or more resource subsets where each resource subset comprises one or more CCEs corresponding to the aggregation level and the resource subset corresponds to a candidate downlink control channel also called a physical downlink control channel (PDCCH) candidate. A user equipment attempts to decode on each resource subset all of the PDCCH types assigned to it to monitor in the control region. There is one blind decoding on a resource subset for each control channel message type with distinct size the user equipment is assigned to monitor. Control channel types with distinct size in terms of the number of bits that make up the control channel payload (including the CRC) also have a distinct coding rate. In one example, convolutional coding is used to code the control channel information making up the control channel for each type. In LTE the PDCCH type is referred to as a Downlink Control Information (DCI) format type. The number of control channel types assigned to a user equipment to monitor is dependent on the transmission mode (e.g. downlink MIMO or downlink single antenna) assigned to the user equipment via higher layer signaling such as RRC (Radio Resource Control) signaling. The set of resources or resource subsets or PDCCH candidates the user equipment needs to monitor at an aggregation level, L, is defined in terms of a search space at that aggregation level, L. There is one search space for each aggregation level where the aggregation levels are L=1, 2, 4, and 8 and contain PDCCH candidates (resource subsets) each composed of L contiguous and consecutive CCEs. A user equipment thus has one set of resources in each search space. This means all of the PDCCH DCI format types assigned to a user equipment to monitor all have the same CCE locations in the set of resources in a search space. Each downlink control channel message type with distinct size and hence distinct coding rate assigned to a user equipment for monitoring must be separately blind decoded. That is, the more control channels with different coding rates assigned to a user equipment the more blind decodings it must perform when searching for the downlink control messages in the control region of each subframe.

When the user equipment checks the CCH candidate set to obtain the control information, if present, it has no knowledge which control channel in the CCH candidate set is used. Thus, the user equipment performs blind detection on all the control channel candidates in the control channel candidate resource set. The flexibility provided by blind detection has the advantage of reducing the overall amount of channel resources needed for control. Such flexibility allows each grant size to adapt to the necessary number of resources for the grant to be reliably received, rather than always using the worst case grant size. For example, for very good channel quality, a single CCE might be used with high confidence that the user equipment will reliably receive the control signal, whereas for very poor signal quality, such as where the user equipment is near the edge of a cell, a large number of CCEs might be used. Thus, blind decoding allows the base station to dynamically select the control channel aggregation size such that a large number of CCEs need not be used all of the time.

On the other hand, increasing the number of blind decodings per subframe control region requires higher complexity in the user equipment. A large number of blind decodings is not desirable, because it may produce excessive hardware complexity to complete all the blind decodings per each subframe control region. It may also elevate the false detection probability given the size limits of error correction code. It may further negatively impact power consumption in the user equipment. A large number of blind decodings may occur from the support of a large number of downlink control channel message types such as which may occur with carrier aggregation (assigning resources on multiple carriers or component carriers), support of enhanced transmission schemes (e.g., frequency-contiguous and frequency-non-contiguous resource allocation, MIMO with different number of layers, CoMP (Coordinated Multiple Point Transmission)), etc. Thus, there is a need for a method for reducing the number of blind decodings and complexity in the user equipment.

DETAILED DESCRIPTION OF THE EMBODIMENTS

There is described control channel management system and method for wireless communication base units and devices in which additional sets of resources in a search space for downlink control channels are provided. As defined above, a resource set is composed of a set of CCEs intended for a particular user equipment to monitor or attempt to decode at a particular CCE aggregation level, L, (e.g., L=1, 2, 4 or 8 CCEs) wherein the set of resources contains one or more resource subsets of L CCEs and corresponds to a PDCCH candidate. A PDCCH is associated with a DCI format type. An additional resource set is needed to support one or more new DCI format types. These new DCI format types may be used for example, supporting the scheduling of new uplink features such as uplink MIMO, new downlink features such as rank-2 beamforming, as well as for supporting downlink and uplink carrier aggregation, etc. Each set of resources in a particular search space assigned to a communication device corresponds to one or more different control channel message type (i.e. a different PDCCH DCI format type). The CCE locations of a communication device's first set of resources assigned in a search space are offset from the CCE locations of the additional set of resources in the same search space also assigned to the communication device. The set of resources in the search space assigned to the communication device to monitor is at least partially based on a control channel message type (e.g., PDCCH DCI format type, type associated with a group of PDCCH DCI formats, etc.) of the control channel message and an identifier associated with the communication device. The set of resources in the search space may also be based on one or more additional parameters such as total number of CCEs in the control region ($N_{CCE,k}$) of the subframe k, subframe number or index k, Control Channel Element (CCE) aggregation level, a maximum number of decoding attempts which are known by the communication device and base unit. The location of each PDCCH candidate CCE locations in each set of resources in the search space is uniquely determined as each PDCCH candidate is composed of L (the aggregation level) contiguous and consecutive CCEs. In an alternate embodiment, the PDCCH candidate may be composed of predetermined CCEs which may not necessarily be contiguous or consecutive. Accordingly, the control channel management system and method described herein maintains a low PDCCH assignment blocking rate for efficient use and operation by assigning PDCCH of different DCI format types with distinct sizes scheduled in the same subframe control region to different sets of resources in a search space that do not 100% overlap or do not overlap at all. Such an approach prevents blocking when multiple uplink and/or multiple downlink scheduling grants or assignments occur in the control region of a subframe which is especially likely to occur for uplink and downlink carrier aggregation when multiple PDCCH may be used in a control region were one PDCCH DCI format type schedules resources on a first or reference carrier and another PDCCH DCI format type schedule resources on additional or other set of carriers not including the reference carrier for a single communication device. In the invention the different sets of resources in a search space are shifted from each other by an offset which is chosen to minimize the number of blind detections while avoiding self blocking and minimizing blocking when scheduling multiple communication devices per subframe control region. Self blocking occurs when not enough CCE or aggregated CCE (PDCCH) candidate locations are available to support all of the PDCCHs that need to be transmitted in the control region of a subframe for a single communication device. Increasing the number of PDCCH candidate locations in the set of resources for a given CCE aggregation level (L)—i.e. search space—could avoid self blocking but would increase the number of blind detections compared to using an offset between the different sets of resources in the search space. So the use of an offset between sets of resources in a search space is the preferred solution.

In another embodiment of the invention the offset between sets of resources depends may also depend on the number of total CCEs (N_cce,k) at subframe or slot k. In another embodiment the offset is used to distinguish between a legacy set of resources and a non-legacy set of resources. In another embodiment in determining a set of resources in a search space it may be needed to determine a location of the set of resources in a search space based on an offset associated with the control channel message type of the control channel message. In one embodiment, the control channel message type of the control channel indicates whether the control channel is a legacy control channel or a non-legacy control channel. One set of legacy control channels would consist of PDCCH with DCI format types of 0,1A,1,1B,1C,1D,2,2A,3,3A.

In another embodiment the offset starts a new set of resources by a shift of one CCE relative to another set of resources. In another embodiment the offset is chosen such that there is no overlap between one (a first) set of resources and another (a second) set of resources. In the latter case it would be possible for the control channel message type associated with the two sets of resources to be distinguished from each other through location of the set of resources without depending on multiple blind decodings on a resource subset, for example, based on using different CRC mask per message type. Also in those cases one set of resources could be assigned to the message type for a first carrier and the other set of resources offset from the first could be assigned the message type for a second carrier. Another offset example for the 1CCE search space, is if the resource subsets in a set of resources for a message type is assigned to CCEs {0,1,2,3,4,5} and N_cce=40 for a given user equipment, then it would be desirable in certain cases to additionally use the offset to assign a different part of the 1CCE search for another user equipment to be assigned to CCEs {20,21,22,23,24,25} to reduce the probability of blocking (i.e. not being able to schedule both UEs in the search space of the same subframe control region. Note the user equipment identifier already supports a random CCE location assignment relative to other user equipment but a user equipment offset would allow another degree of freedom to avoid blocking.

One aspect of the present invention is a method in a base unit for indicating the control message (PDCCH) resource subset corresponding to the control message (or PDCCH) which is selected by the base unit from one of the one or more candidate control channel message resource subsets in a search space within a control region based on at least a control channel message type (e.g., PDCCH DCI format type) of the control channel message to a communication device. Note in some of the embodiments below, the PDCCH DCI format type and control channel message type are used synonymously. However, it must be understood that the control channel message type may correspond to an identifier other than the PDCCH DCI format type. The communication device determines which set of resources in a search space to use for blind decoding attempts at least partially based upon a location offset (in terms of number of CCEs or aggregated CCEs) associated with or determined by a control channel message type of the control channel message the communication device is to search and an identifier associated with the communication device. Each set of resources located in a search space therefore consists of candidate control channels (resource subsets) of a particular control channel message type with a location offset relative to a set of resources with zero offset or relative to the location of a reference set of resources. Control information for the communication device is transmitted by the base unit via the selected control channel using the selected resource subset from the set of resources associated with the message type of the control channel. The communication device must use blind decoding attempts to determine which resource subset (or control channel candidate) was used from the set of resources in a search space for communicating the control channel message containing the control information.

Another aspect of the present invention is a method in a communication device for identifying one or more control channel candidate search spaces for control information. Where in the preferred embodiment each search space corresponds to a particular CCE aggregation level (L) where L CCEs are aggregated to form control channel message (PDCCH) candidates where, for example, L=1, 2, 4, or 8. An identifier associated with the communication device is received from a base unit. This identifier can be a radio network temporary identifier (RNTI) or more specifically may be a C-RNTI (Cell-RNTI). Also, a control channel message type (e.g., DCI format type) for each control channel message to be monitored is determined may be based on the communication device's configured transmission mode (e.g. MIMO or single antenna transmission mode). For each of the aggregation level search spaces, the communication device may use its identifier, control channel message type, and other parameters such as control channel message type location offset, total number of CCEs in the control region of the subframe, subframe number or index, CCE aggregation level, and maximum number of PDCCH candidates per aggregation level or a maximum number of decoding attempts to determine the per control channel message type set of resources in the search space and the resource subsets in each set of resources that correspond to the PDCCH candidates to be monitored (blindly decoded) per subframe control region.

The set of resources for the control channel associated with the communication device is then searched. Since the base unit may choose the resource subset (control channel candidate) from any of the per aggregation level search spaces then the communication device must perform a set of blind decodings in each set of resources of each search space corresponding to the targeted control channel message type until the control channel with the corresponding message type is correctly decoded and/or all blind decoding attempts for the set of candidate control channel (resource subset) locations have been exhausted. Typically, the aggregation level a control channel message type is chosen by the base unit based on a downlink Channel Quality Indicator (CQI) reports from the communication device and the size (or coding rate) of the message.

As required, detailed embodiments are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
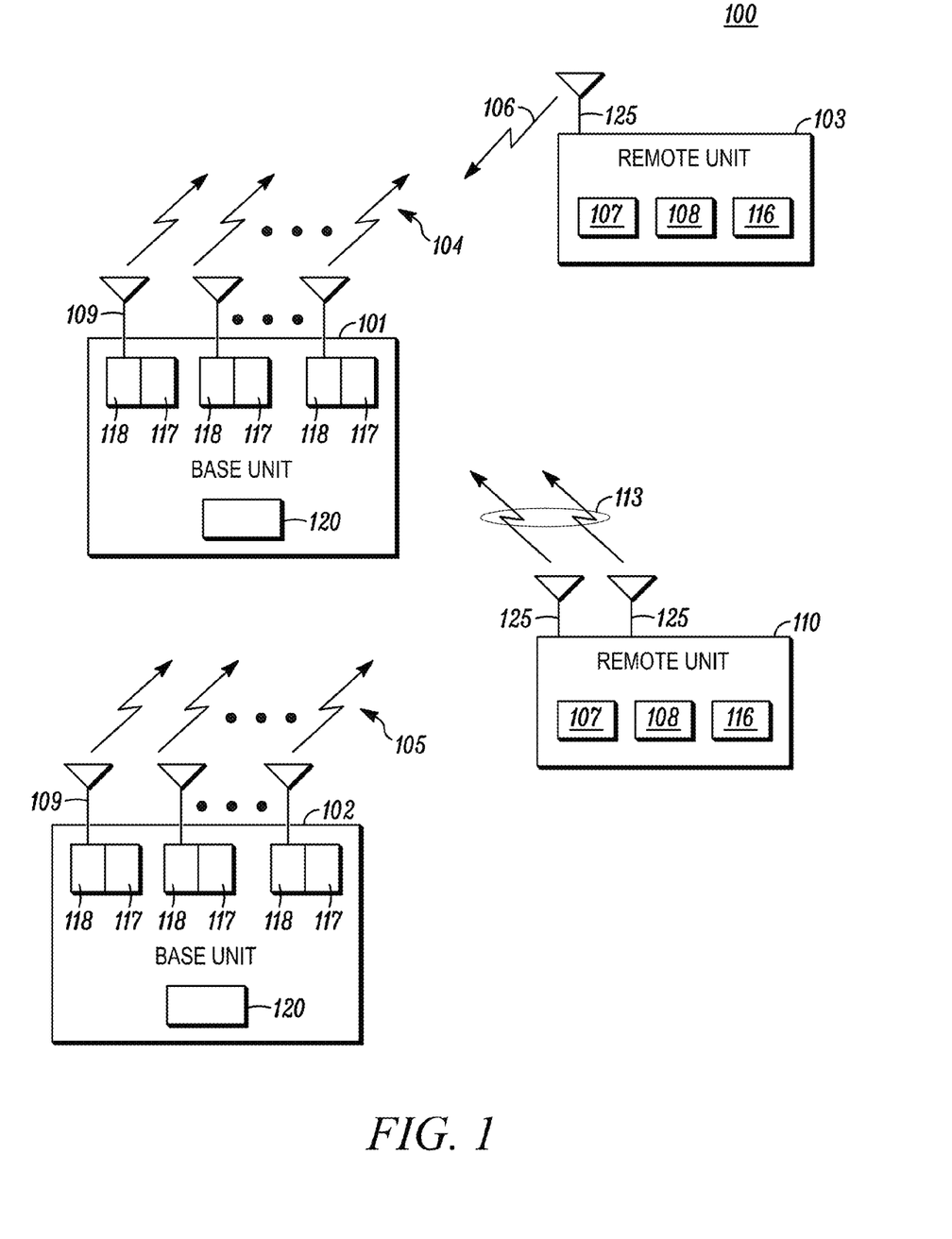
FIG. 1 is a diagram view representing an embodiment of a communication system in accordance with the present invention.

With reference now to FIG. 1, a wireless communication system 100 comprising multiple cell serving base units forming a network distributed over a geographical region. A base unit may also be referred to as an access point, access terminal, Node-B, eNode-B, Home Node-B, Home eNode-B, relay node or similar terminologies known in the art. The one or more base units 101 and 102 serve a number of remote units 103 and 110 within a serving area or cell or within a sector thereof. The remote units may also be referred to as subscriber units, mobiles, mobile units, remote units, users, terminals, subscriber stations, user equipment (UE), user terminals, communication devices, and the like. The network base units communicate with remote units to perform functions such as scheduling the terminals to receive or transmit data using available radio resources. The base units are generally part of a radio access network that includes one or more controllers communicably coupled to one or more corresponding base units. The wireless network also comprises management functionality including data routing, admission control, subscriber billing, terminal authentication etc., which may be controlled by other network entities, as is known generally by those having ordinary skill in the art. The access network is generally communicably coupled to one or more core networks, which may be coupled to other networks like the Internet and public switched telephone networks among others. These and other elements of access and core networks are not illustrated but are known generally by those having ordinary skill in the art.

Base units 101 and 102 transmit downlink communication signals 104 and 105 to served remote units on at least a portion of the same resources (time and/or frequency and/or space divided). Remote units 103 and 110 communicate with one or more base units 101 and 102 via uplink communication signals 106 and 113. Sometimes the base unit is referred to as a "serving" or connected or anchor cell for the remote unit. In one implementation, the remote units support aggregated carrier access. The remote units may have half duplex (HD) or full duplex (FD) transceivers. Half-duplex transceivers do not transmit and receive simultaneously whereas full duplex terminals do. The remote units may also communicate with the base unit via a relay node. The one or more base units may comprise one or more transmitters 117 and one or more receivers 118 that serve the remote units. The number of transmitters 117 at the base unit may be related, for example, to the number of transmit antennas 109 at the base unit. When multiple antennas are used to serve each sector to provide various advanced communication modes, for example, adaptive beam-forming, transmit diversity, transmit SDMA, and multiple stream transmission, etc., multiple base units can be deployed. These base units within a sector may be highly integrated and may share various hardware and software components. For example, all base units co-located together to serve a cell may be referred to as a base station. The remote units may also comprise one or more transmitters 107 and one or more receivers 108. The number of transmitters may be related, for example, to the number of transmit antennas 125 at the remote unit. For example, the remote units may have 1, 2, 3, 4 or more antennas. The remote units 103, 110 operate under that control of a controller 116. Controller 116 controls the operation of the remote unit, including processing user inputs, transmission and reception of signals, scheduling, encoding, formatting, etc.

In one embodiment, the communication system utilizes OFDMA or a next generation single-carrier based FDMA architecture for uplink transmissions, such as interleaved FDMA (IFDMA), Localized FDMA (LFDMA), DFT-spread OFDM (DFT-SOFDM) with IFDMA or LFDMA. In other embodiments, the architecture may also include the use of spreading techniques such as direct-sequence CDMA (DS-CDMA), multi-carrier CDMA (MC-CDMA), multi-carrier direct sequence CDMA (MC-DS-CDMA), Orthogonal Frequency and Code Division Multiplexing (OFCDM) with one or two dimensional spreading, or simpler time and frequency division multiplexing/multiple access techniques. In another implementation, the wireless communication system is compliant with the 3GPP Universal Mobile Telecommunications System (UMTS) LTE protocol, also referred to as EUTRA or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. In yet another implementation, the wireless communication system is compliant with the 3GPP Universal Mobile Telecommunications System (UMTS) LTE-Advanced protocol, also referred to as LTE-A or some later generation or release of LTE thereof, wherein the base unit can transmit using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The disclosure is not intended to be implemented in any particular wireless communication system architecture or protocol. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a TDD (Time Division Duplex) or FDD (Frequency Division Duplex) system.

Generally, a wireless communication network infrastructure scheduling entity located, for example, at each base unit 101 and 102 in FIG. 1, allocates or assigns radio resources to remote units in the network. The base units each include a scheduler 120 for scheduling and allocating resources to remote units in corresponding serving areas or cells or sectors. In multiple access schemes such as those based on OFDM methods and the long term evolution of UTRA/UTRAN Study Item in 3GPP (also known as evolved UTRA/UTRAN (EUTRA/EUTRAN)) or 3GPP LTE, scheduling may be performed in the time, frequency and/or spatial dimensions using a Frequency Selective (FS) scheduler. In some embodiments, each remote unit may provide a frequency band channel quality indicator (CQI) or other metric to the scheduler to enable scheduling.

In OFDM systems or OFDM like systems such as DFT-SOFDM and IFDMA, a resource allocation is a frequency and time allocation that maps information for a particular communication device or remote unit to sub-carrier resources from a set of available sub-carriers as determined by the scheduler. This allocation may depend, for example, on the frequency-selective channel-quality indication (CQI) or some other metric reported by the remote unit to the scheduler. The channel-coding rate and the modulation scheme, which may be different for different portions of the sub-carrier resources, are also determined by the scheduler and may also depend on the reported CQI or other metric. In code division multiplexed networks, the resource allocation is code allocation that maps information for a particular communication device or remote unit to channelization code resources from a set of available channelization codes as determined by the scheduler.

Figure 2:
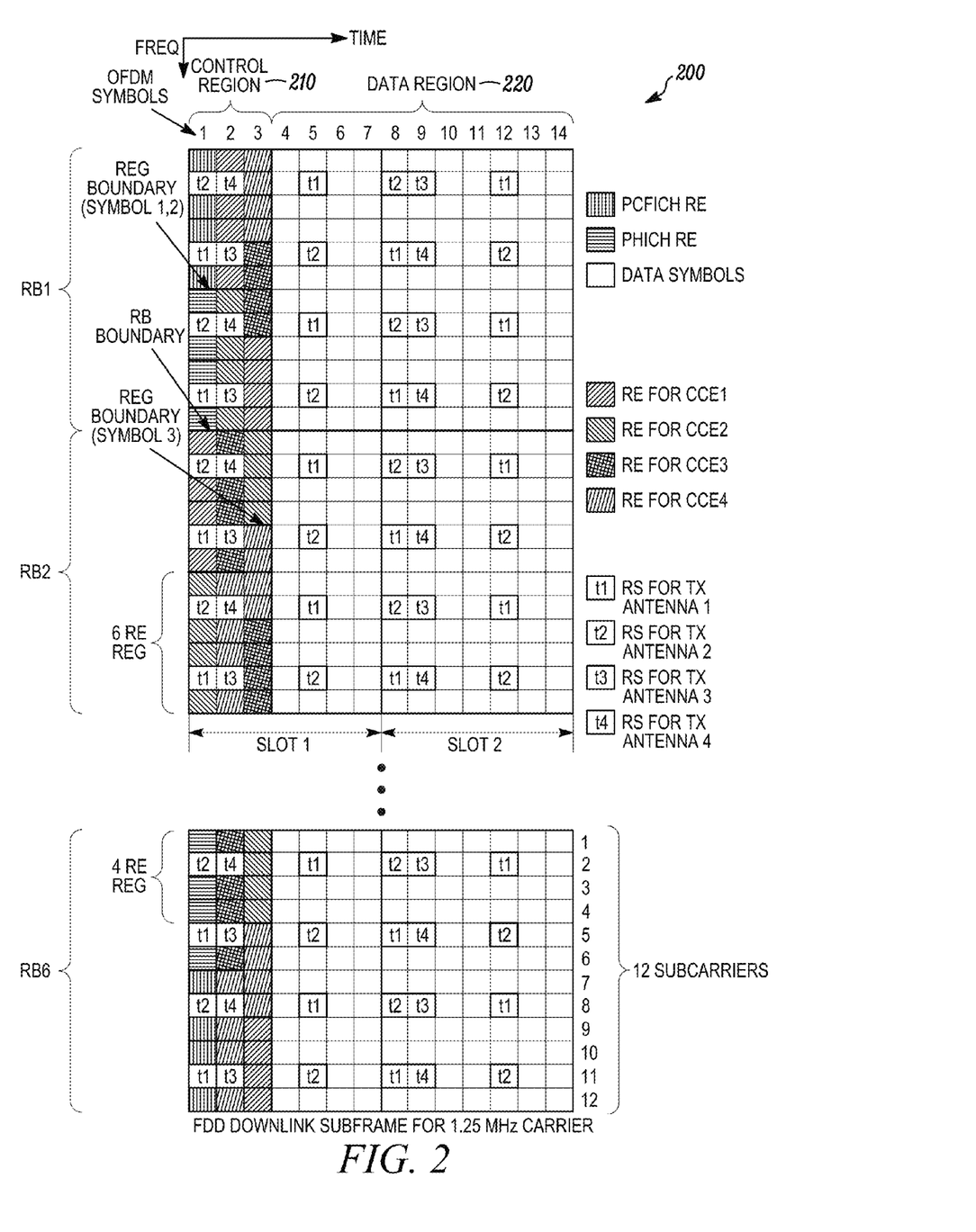
FIG. 2 is a diagram illustrating an embodiment of a subframe, which is a portion of a radio frame, used in the communication system of FIG. 1.

FIG. 2 illustrates a sub-frame 200 that constitutes a portion of a radio frame. The radio frame generally comprises a plurality of subframes, which may form a concatenated continuum of subframes. An example radio frame contains 10 subframes. Each subframe 200 corresponds to a transmission time interval (TTI). An example TTI is 1 ms. Each subframe 200 is composed of two slots each having a 0.5 ms length with each slot containing for example, 7 OFDM symbols (as in FIG. 2) given a normal cyclic prefix length and only 6 OFDM symbols if an extended cyclic prefix length is used. Each subframe 200 is composed of a control region 210 and a data region 220. The control region 210 size is for example 1, 2, or 3 OFDM symbols depending on the number of symbols signaled by the physical control format indicator channel (PCFICH) which is always transmitted in symbol 0 of each sub-frame control region and is composed of four resource element groups (REGs) distributed across frequency. Each REG is composed of 4 contiguous or nearly contiguous control resource elements and may also include 2 reference signals if the associated antenna ports are configured. Each control channel element (CCE) consists of 9 REGs which are pseudo-randomly distributed or interleaved across frequency and the OFDM control symbols in the control region 220 based on a subblock interleaver. The REGs available to use for CCEs are those left over from PCFICH and the Physical Hybrid ARQ Indicator CHannel (PHICH). A Physical Downlink Control CHannel (PDCCH) consists of for example 1, 2, 4, or 8 CCEs. In the case where more than 1 CCE is aggregated to form the PDCCH the CCEs are in embodiment logically contiguous in terms of the location in the PDCCH candidate search spaces. In FIG. 2 all four antenna ports are configured such that the corresponding four common reference signals are present with two in OFDM symbol 0 (t1, t2) and two (t3, t4) in OFDM symbol 1 in the control region 210. Note, t1, t2, t3, t4 also appear in the data region 220 on symbols 5, 8, 9, and 12. The data region 220 contains data symbols with one data symbol per resource element (RE). Twelve consecutive resource elements for a duration of a slot are grouped to form resource blocks (RBs). The useful bandwidth of a 1.4 MHz LTE carrier spans six resource blocks. In 3GPP LTE besides 1.4 MHz the other defined carrier bandwidths are 3, 5, 10, 15, and 20 MHz which span 15, 25, 50, 75, and 100 RBs respectively. A resource block spans a slot or 7 symbols for a normal cyclic prefix length such that two RBs (or a single RB pair) span the subframe. The number of data OFDM symbols in the first RB of a subframe is shortened by the number of OFDM control symbols allocated.

A particular user equipment must locate the control channel elements corresponding to each PDCCH candidate it is to monitor (blindly decode for each subframe control region). The CRC of each PDCCH will be masked by a unique identifier corresponding to the user equipment that the base unit is trying to schedule. The unique identifier is assigned to the UE by its serving base unit. This identifier is known as a radio network temporary identifier (RNTI) and the one normally assigned to each UE at call admission is the cell RNTI or C-RNTI. A UE may also be assigned a semi-persistent-scheduling C-RNTI (SPS C-RNTI) or a temporary C-RNTI (TC-RNTI). When a UE decodes a PDCCH it must apply its C-RNTI in the form of a mask to the PDCCH CRC for successful PDCCH decoding to occur. When a user equipment successfully decodes a PDCCH of a particular DCI format type it will use the control information from the decoded PDCCH to determines for example, the resource allocation, Hybrid ARQ information, and power control information for the corresponding scheduled downlink or uplink data transmission. The legacy DCI format type 0 is used for scheduling uplink data transmissions on the Physical Uplink Shared CHannel (PUSCH) and DCI format type 1A is used for scheduling downlink data transmissions on the Physical Downlink Shared CHannel (PDSCH). Other DCI format types are also used for scheduling PDSCH transmissions including DCI format 1,1B,1D,2,2A each corresponding to a different transmission mode (e.g. single antenna transmissions, single user open loop MIMO, multi-user MIMO, single user close loop MIMO, rank-1 preceding). Also there are legacy DCI format 3 and 3A for scheduling the transmission of joint power control information. PDCCH DCI format 0, 1A, 3, and 3A all have the same size payload and hence the same coding rate. So only one blind decoding is required for all of 0, 1A, 3, 3A per PDCCH candidate. The CRC is then masked with C-RNTI to determine if the PDCCH was DCI format type 0 or 1A and a different RNTI if it is 3 or 3A. DCI format type 0 and 1A are distinguished by DCI type bit in the PDCCH payload itself (i.e. part of the control information on one of the control information fields). A UE is always required to search for all of DCI formats 0, 1A at each PDCCH candidate location in the UE specific search spaces. There are four UE specific search spaces for aggregation levels 1, 2, 4, and 8. Only one of the DCI format types 1, 1B, 1D, 2, or 2A is assigned at a time to a UE such that a UE only needs to do one additional blind decoding per PDCCH candidate location in the UE specific search space besides the one blind decoding needed for the 0, 1A DCI types. The PDCCH candidate locations are the same for the DCI format types when they are located in the UE specific search spaces. There are also two 16 CCE common search spaces of aggregation level 4 and 8 respectively that are logically and sometimes physically (when there are 32 or more control channel elements) adjacent to the UE specific search spaces. In the common search spaces a UE monitors DCI types 0, 1A, 3, and 3A as well as DCI format type 1C. DCI format type 1C is used for scheduling broadcast control which includes paging, random access response, and system information block transmissions. DCI 1A may also be used for broadcast control in the common search spaces. DCI 0 and 1A are also used for scheduling PUSCH and PDSCH in common search spaces. A UE is required to perform up to 4 blind decodings in the L=4 common search space and 2 blind decodings in the L=8 common search space for DCI formats 0,1A,3, and 3A and the same number again for DCI 1C since DCI 1C is not the same size as DCI 0, 1A, 3 and 3A. A UE is required to perform (6, 6, 2, 2) blind decodings for L=(1, 2, 4, 8) UE specific search spaces respectively where L refers to the aggregation level of the search space. The total maximum number of blind decoding attempts a UE is then require to perform per subframe control region is therefore 44 (=2×(6,6,2,2)+2×(4,2)). A hashing function is used by the serving base unit and the UE to find the PDCCH candidate locations in each search space. The hashing function is based on the UE C-RNTI (or sometimes the TC-RNTI), aggregation level (L), the total number of CCEs available in the control region (Ncce), the subframe number or index, and the maximum number of PDCCH candidates for the search space.

Figure 3:
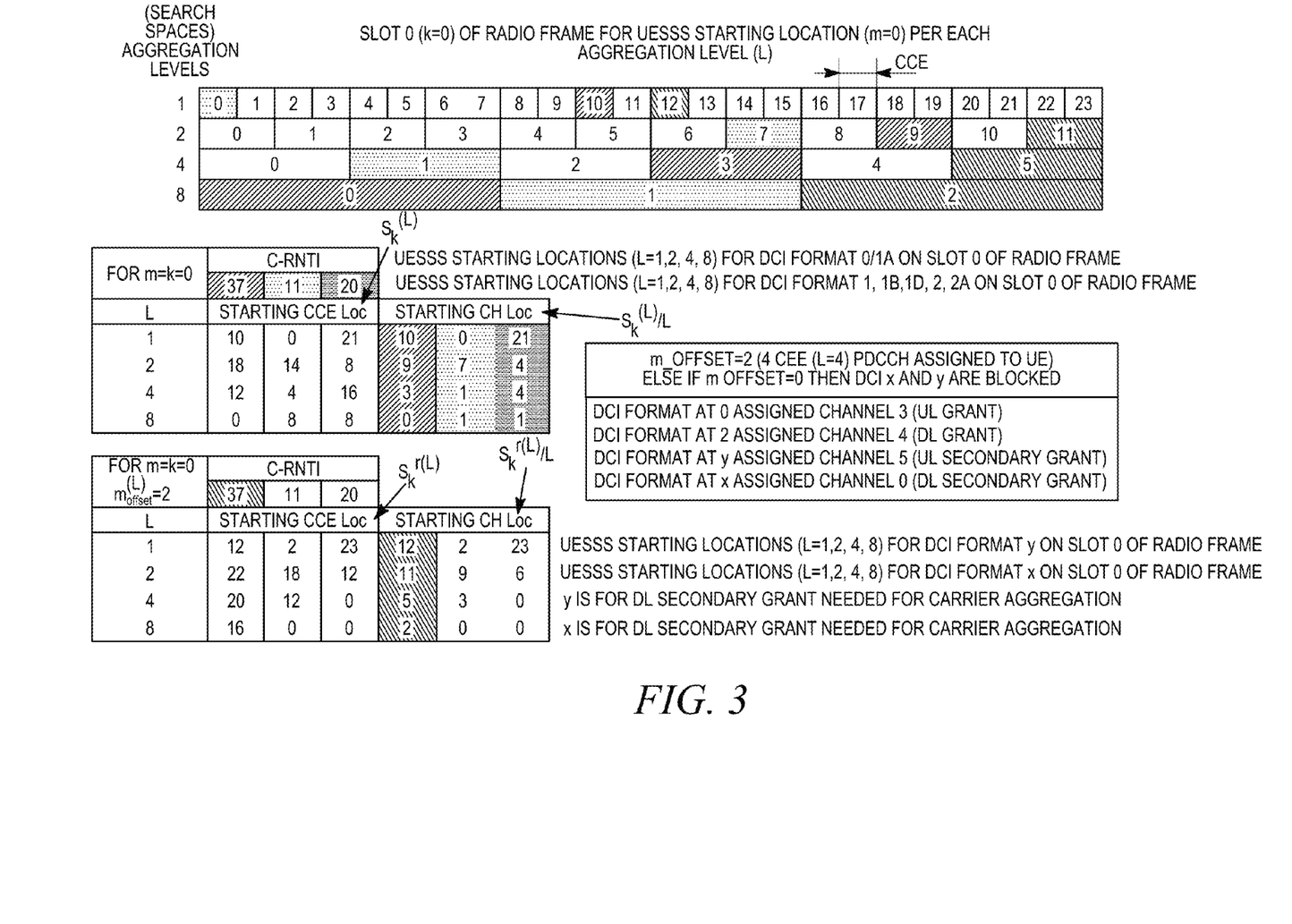
FIG. 3 illustrates a search space location and control channel candidate location for a communication device in accordance with the present invention.

FIG. 3 illustrates a search space CCE location(s) and Channel location(s), in logical space as opposed to physical space shown in FIG. 2. The embodiment shown in the figure applies to a communication device with C-RNTI=37 and a communication device with C-RNTI=11. Physical Downlink Control Channel (PDCCH) may be composed of 1, 2, 4, or 8 aggregated control channel elements (CCEs) where there are (6,6,2,2) PDCCH hypothesis locations for each of the (1,2,4, 8) aggregation level search spaces. There are downlink (DCI format 1, 2, 1B, 1D, 2A) and uplink/downlink (DCI format 0/1A) search spaces for each aggregation level, but the PDCCH CCE locations that are randomized by a communication device identification (UEID)-based hashing function are the same for the downlink and the uplink/downlink aggregation level search spaces. There are enough locations such that blocking of PDCCH assignments is sufficiently low. However, more search spaces or resource sets in a search space (e.g., UL and DL transmission enhancements, UL and DL Carrier aggregation) may be added such that blocking will start to increase to become a problem if the new search spaces or resource sets in a search space at a particular aggregation level are allowed to completely overlap the current DL and UL/DL search spaces. The present invention modifies the hashing function to map the newer search spaces or resource sets in a search space at a particular aggregation level to different CCE locations that do not overlap or only partially overlap with the existing search spaces in order to minimize the blocking probability.

Each communication device searches the control region in each subframe for control channels (PDCCHs) with different downlink control indicator (DCI) formats using blind detection, where the PDCCH CRC is scrambled with either a communication device's C-RNTI (UEID) if it is for scheduling data on the Physical Downlink Shared Channel (PDSCH) or Physical Uplink Shared Channel (PUSCH) or scrambled with SI-RNTI, P-RNTI, or RA-RNTI if it is for scheduling broadcast control (system information, paging, or random access response respectively). Other scrambling types include joint power control, semi-persistent scheduling (SPS), and a temporary C-RNTI for use with scheduling some random access messages Channel coding (e.g., Convolutional coding) blind detection is used to distinguish between PDCCH DCI formats with different sizes. For DCI formats of the same size different masking of the scrambled CRC can be used or instead an extra bit in the PDCCH payload itself can be used to distinguish between same size PDCCH DCI formats (e.g. DCI format 0 and 1A). An example includes, but is not limited to, the case of broadcast control which uses SI-RNTI, P-RNTI, or RA-RNTI for DCI format 1A instead of C-RNTI.

There is a common search space (CSS) type and a communication device specific search space (UESS) type which are logically adjacent but may physically overlap, e.g., when the number of CCEs available in the control region is less than 32. The CSS may be composed of the minimum of the first 16 CCEs or the maximum number of total CCEs (N_cce) in the control region available whichever is smaller. The CSS is used for scheduling broadcast control (DCI format 1A or 1C), joint power control (DCI Format 3 and 3A) or for PUSCH/PDSCH data using compact grants (DCI format 0/1A) all of which assume aggregation of 4 or 8 CCEs per PDCCH. So, for CSS there are two search spaces, one with aggregation level 4 (4CCEs per PDCCH hypothesis) and one with aggregation level 8 (8CCEs per PDCCH hypothesis) with (-,-,4,2) blind detection locations for DCI format 0/1A and (-,-,4,2) bind detection locations for DCI 1C for aggregation levels (1,2,4,8) respectively. It should be noted '-' means '0'.

The communication device specific search space is for scheduling PUSCH or PDSCH data using downlink DCI formats that support different transmission modes (DCI format 1 and 1A for SIMO, DCI format 1B for rank-1 preceding, DCI format 1D for MU-MIMO, DCI format 2 for rank-2 preceding, DCI format 2A for open loop spatial multiplexing) and the single uplink DCI format (DCI format 0) supporting SIMO and switched antenna transmit diversity. The communication device specific search space supports 4 aggregation levels consisting of (1, 2, 4, or 8) contiguous CCEs per PDCCH (candidate) hypothesis with (6,6,2,2) blind detection locations, respectively.

In one method of determining the CCE locations $S_k^{(L)}$ corresponding to a PDCCH candidate m of each aggregation level L (where L=(1, 2, 4, or 8)) search space for subframe 'k' of a radio frame is given by equation:

$$S_k^{(L)} = L\{(Y_k + m) \bmod (\text{floor}(N_{CCE,k}/L))\} + i \quad (1)$$

where
  $Y_k = 39827 \cdot Y_{k-1} \bmod 65537$ where $Y_{-1} = \text{n\_RNTI}$ for the UE specific search space
  n_RNTI≠0 is either C-RNTI or temporary C-RNTI; note $Y_k=0$ for the common search space (CSS); $N_{CCE,k}$ is the number of total CCEs available for subframe k; and
  m=0, . . . , M(L)−1 where M(L)=(6,6,2,2) for L=(1,2,4,8) and
  i=0, . . . , L−1 where i spans each consecutive CCE of the PDCCH hypothesis The point of equation (1) is to randomize the UESS PDCCH hypothesis CCE locations per aggregation level search space to minimize blocking of PDCCH assignments. A communication device performs a convolutional coding blind detection (CCBD) for DCI format 0/1A and a CCBD for one of (1, 1B, 1D, 2, 2A) semi-statically assigned DCI formats at each aggregation level PDCCH hypothesis. Hence, 32 CCBDs (=2×(6,6,2,2)) are performed in the UESS which taken with the 12 BDs (=2×(4,2)) performed in the CSS means a communication device must be capable of 44 CCBDs. Note that DCI format 0/1A and (1, 1B, 1D, 2, 2A) PDCCH hypothesis locations are the same.

Other uplink DCI formats support uplink rank-1 and rank-2 MIMO and non-contiguous resource allocations with DCI format sizes different than DCI format 0. 16 CCBDs (=(6,6,2,2)) are performed by a communication device to search for one of the semi-statically assigned new uplink DCI formats (e.g. 0_a, 0_b, 0_2). Additionally, another 17 (=(-,3, 2,2)+(3,3,2,2)) CCBDs may be used to support (new) carrier aggregation (based on common control channel on anchor carrier approach) due to the need for other DCI format sizes for UL and DL to support 4 or 5 carrier aggregation. To minimize blocking, the locations of the semi-statically assigned uplink DCI format are shifted. This is accomplished by increasing the range of m such that:
  m ranges from 0 to 2*M(L)−1 where as before M(L)=(6, 6,2,2).
In the case of carrier aggregation then the 'm' range can be further increased to minimize blocking such that:
  m ranges from 0 to 2*M(L)+M'_DL(L)+M'_UL(L)−1
  where M(L)=(6,6,2,2), M'_DL(L)=(-,3,2,2), and M'_UL (L)=(3,3,2,2).
For this example, the UESS CCBDs for DL/UL+UL+DL_CA+UL_CA search spaces is then 2×(6,6,2,2)+(6,6,2, 2)+(-,3,2,2)+(3,3,2,2)=65. The total CCBDs is then 77.

If, however, there exists a format indicator (FI) (A format indicator indicates the DCI format used and may be encoded separately from the PDCCH DCI format) at each potential PDCCH hypothesis location and if the assigned DCI format is first detected based on the FI, then m ranges from 0 to M(L)−1 for both DL/UL {0/1A} and DL {1,1B,1D,2,2A} search spaces and further ranges from M(L)−Ko(L) to 2*M(L)−Ko (L)−1 for the UL {0_a,0_b,0_2} search spaces where Ko(L) is the overlap in CCEs of the DL/UL and the UL search spaces. For example, if Ko(L)=(3,3,1,1) then number of UESS CCBDs is (6,6,2,2)+(1/2)*(6,6,2,2)=24 such that the total CCBDs is still reduced from 60 to 36 but blocking is not significantly increased.

In the case of both UL search spaces and carrier aggregation search spaces for 4 and 5 aggregated carriers then m ranges from
  [0 to M(L)−1], (rel-8 legacy DL/UL and DL UESS)
  [M(L)−Ko(L) to 2M(L)−Ko(L)−1], (rel 9/10 UL UESS)
  [2M(L)−Ko(L)−K1(L) to 2M(L)−Ko(L)−K1(L)+M'_DL (L)−1] (Aggregation DL)
  [2M(L)−Ko(L)−K1(L)+M'_DL(L)−K2(L) to 2M(L)−Ko (L)−K1(L)+M'_DL(L)−K2(L)+M'_UL(L)−1] (Aggregation UL)

For example, if Ko(L)=(3,3,1,1), K1(L)=(3,3,1,1), K2(L)=(3,3,1,1), M'_DL(L)=(-,6,2,2) and M'_UL(L)=(6,6, 2,2) such that the number of CCBDs is (6,6,2,2)+1/2*(6,6,2, 2)+1/2*(-,6,2,2)+1/2*(6,6,2,2)=37 CCBDs for UESS for a total of 49 CCBDs with good blocking properties. So FI only buys about 28 fewer CCBDs (=77−49) with about the same blocking and marginally lower false detection rate.

Thus, for the embodiments herein, the CCE locations $S'_k^{(L)}$ corresponding to a PDCCH candidate m of each aggregation level L (where L=(1, 2, 4, or 8)) search space for subframe 'k' of a radio frame is given by equation:

$$S'_k^{(L)} = L\{(Y_k + m + m_{offset}^{(L)}) \bmod (\text{floor}(N_{CCE,k}/L))\} + i$$

It should be noted that $S'_k^{(L)} = S_k^{(L)}$ for $m_{offset}^{(L)} = (0,0,0,0)$ for backward compatibility, where $Y_k = (39827 \cdot Y_{k-1}) \bmod 65537$ where $Y_{-1} = \text{n\_RNTI}$ for the UE specific search space (UESSS) n_RNTI≠0 is either C-RNTI or temporary C-RNTI; note $Y_k=0$ for the common search space (CSS) m=0, . . . , M(L)−1 where M(L)=(6,6,2,2) for L=(1,2,4,8) and $m_{offset}^{(L)} = (2,2,2,2)$ for DCI formats other than DCI format 0/1A and 1,1B,1D,2, 2A, i=0, . . . , L−1 where i spans each consecutive CCE of the PDCCH hypothesis. In an alternate embodiment, the PDCCH candidate may be composed of predetermined CCEs which may not necessarily be contiguous or consecutive.

The location offset, $m_{offset}^{(L)}$ offset is a function of the aggregation level L. In an alternate embodiment, the location offset may also may depend on other parameters such as $N_{CCE,k}$, subframe index, k. For example, the search spaces for existing DCI formats and new DCI formats may be uniformly spaced across the $N_{CCE,k}$ CCEs. That is, if the existing 1CCE search space for a communication device is {0,1,2,3,4,5} and $N_{CCE,k}$=40, the 1CCE search space for the new DCI formats for the communication device may be {20,21,22,23,24,25}. This could be useful to reduce blocking from another communication device with 8 CCE aggregations starting at 0.

So the PDCCH hypotheses in the case where UE C-RNTI=37 is scheduled with four PDCCH DCI types (0,2, x,y) are shown in FIG. 3, where $m_{offset}^{(L)}$=(2,2,2,2) for L=(1, 2,4,8). The starting 4CCE channel locations for DCI 0/1A and DCI 1,1B,1D,2A,2B is channel location=3 so if both DCI 0 and one of DCI 1,1B,1D,2A,2B are scheduled then there are enough 4CCE PDCCH hypotheses (i.e. two 4CCE hypotheses which are taken from (6,6,2,2)) to schedule both. There are not enough 4CCE PDCCH hypotheses when the number of 4CCE PDCCH (with distinct sizes) scheduled to the UE exceeds 2. But as shown in FIG. 3 with $m_{offset}^{(L=4)}$=2 for DCI types other than 0/1A and 1,1B,1D,2,2A there are then four 4CCE PDCCH hypotheses that the serving eNB scheduler can choose from such that is possible to schedule e.g. four 4CCE PDCCH grants. So a $m_{offset}^{(L)}$=(2,2,2,2) is the best choice for the offset value given there are (6, 6, 2, 2) hypothesis and given it is necessary to reserve room for 2 more PDCCH candidate grants to avoid blocking. An offset of 2 would also solve the 8CCE PDCCH aggregation case as well.

Figure 4:
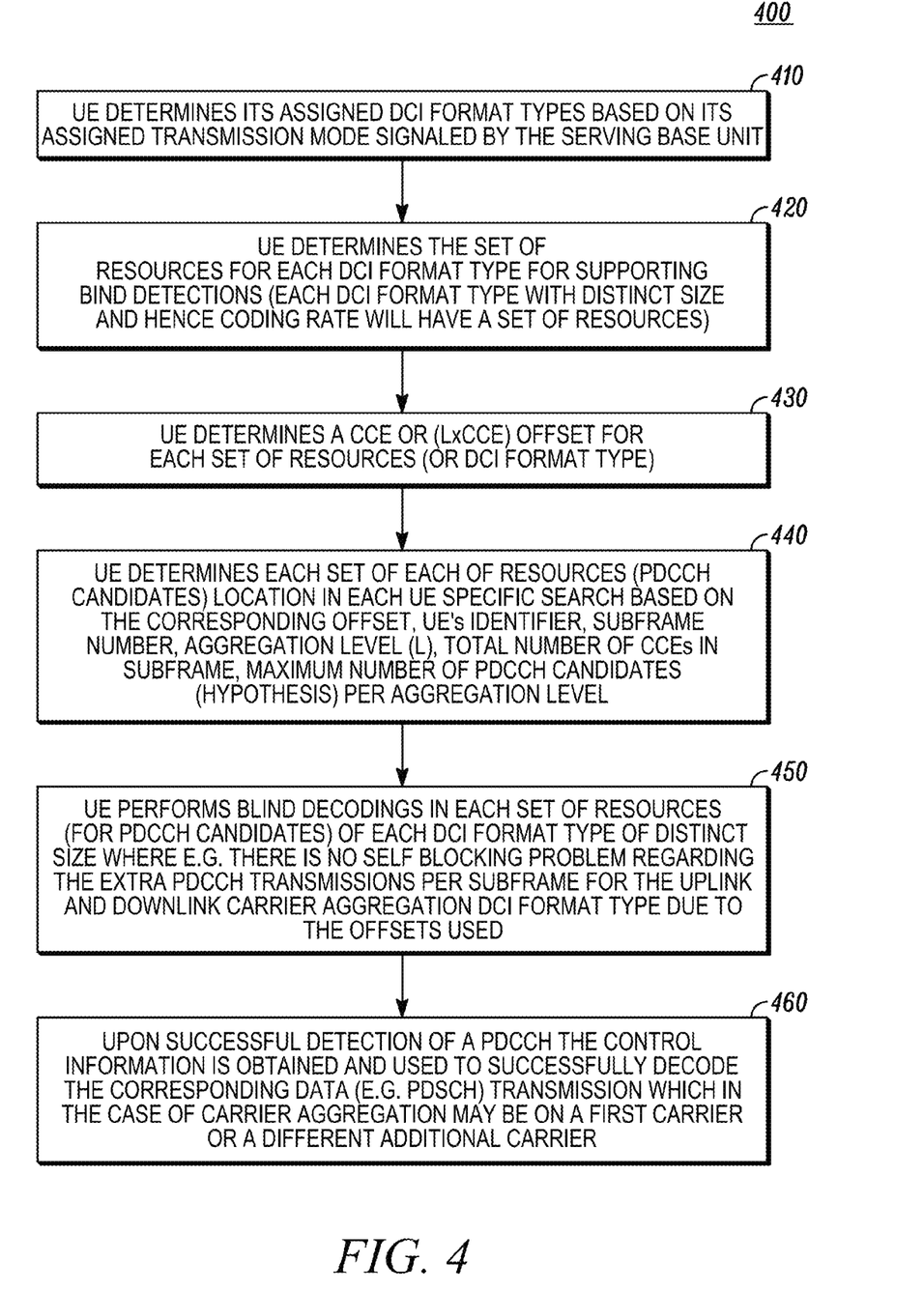
FIG. 4 is a flow diagram representing an example operation of a communication device in accordance with the present invention.
Figure 5:
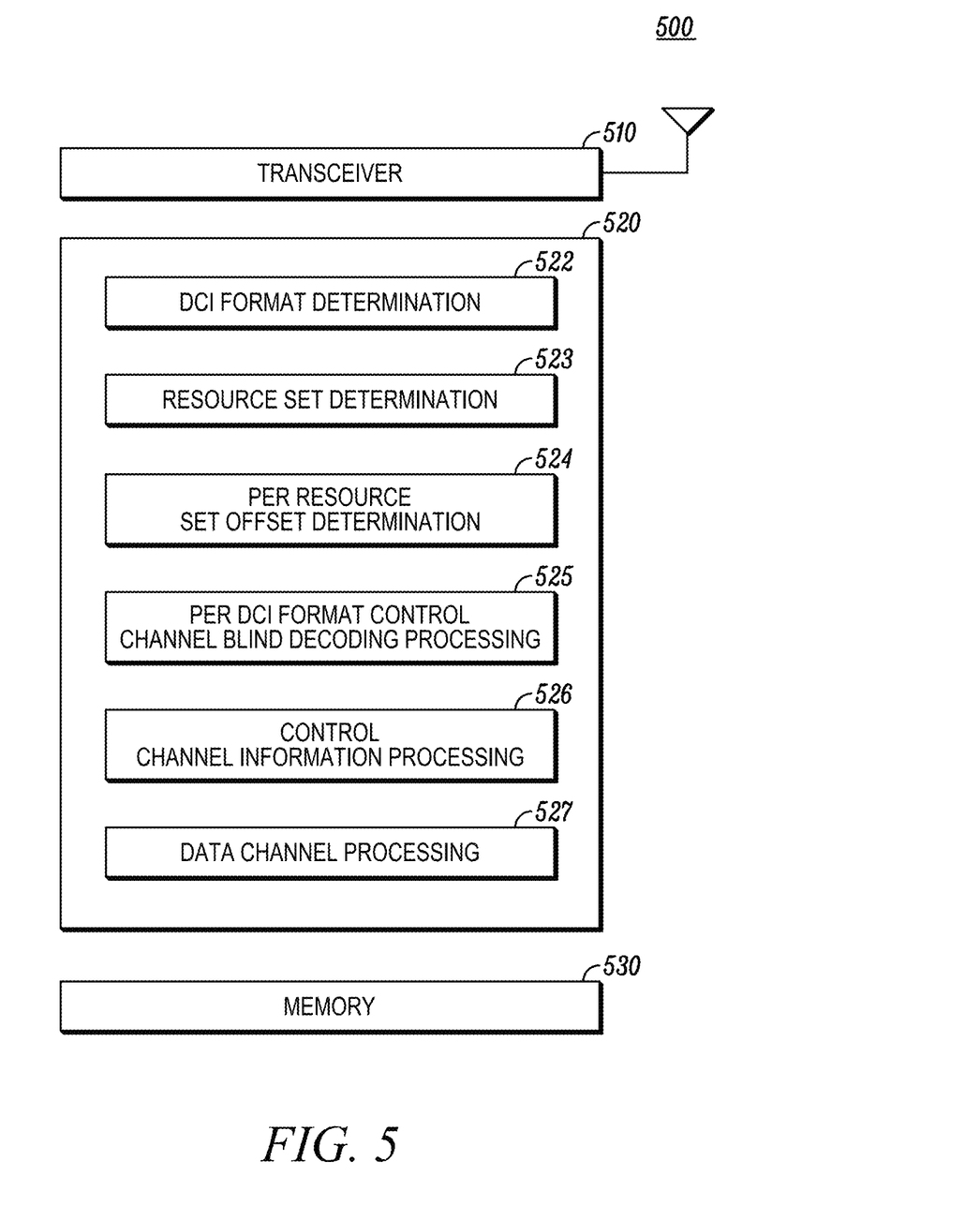
FIG. 5 is a block diagram representing example components of a communication device in accordance with the present invention.

Referring to FIGS. 4 and 5, there is provided a flow diagram representing an example operation 400 of a communication device and a block diagram representing example components of a communication device 500, respectively. The communication device represented by the flow diagram and/or the block diagram determines control information in accordance with the present invention. As shown in FIG. 5, the communication device 500 comprises a transceiver 510, one or more processors 520, and memory 530. FIG. 5 illustrates a processor 520 have various processors therein to perform functions of the communication devices. It is to be understood that one or more of these components 522-527 illustrated may be combined together or separated from one or more of the other components of the processor without departing from the spirit and scope of the present invention As represented by FIGS. 4 and 5, the transceiver 510 of the communication device 500 receives a control channel message associated with the communication device in a control region on a first carrier from a base unit and a DCI format or control message type determination processor 522 determines a set of resources in a search space within the control region. The set of resources in the search space is at least partially based on a control channel message type of the control channel message and an identifier associated with the communication device. In one embodiment, the control channel message type of the control channel message indicates that the control channel message is for at least one additional carrier, the at least one additional carrier not including the first carrier. In an alternate embodiment, the control channel message type of the control channel message indicates an identifier associated with at least one additional carrier, the at least one additional carrier not including the first carrier. In an alternate embodiment, the control channel message type of the control channel message may indicate an identifier associated with a group or subset of DCI formats. In another embodiment, the control channel message is a Physical Downlink Control Channels (PDCCH) message. For example, as represented by step 410, the communication device 400 may determine its assigned control message types (e.g., DCI format types) based on its assigned transmission mode signaled by the serving base unit. A resource set determination processor may then determines which of its DCI format types have distinct size (different coding rate) and therefore need a corresponding set of resources for supporting blind detections at step 420. For one embodiment, a set of resources in a search space may be determined at least partially based on a slot number in a radio subframe. In one embodiment, the set of resources in the search space includes determining a set of candidate Control Channel Elements (CCEs) corresponding to a set of candidate Physical Downlink Control Channels (PDCCH) in the search space. In one embodiment, the search space within the control region is associated with a Control Channel Element (CCE) aggregation level.

The communication device 400 may determine a location of the set of resources in a search space based on an offset associated with the control channel message type of the control channel message. The offset may correspond to a first offset when the control information in the control channel message schedules resources for a first carrier, and the offset may corresponds to a second offset when the control information in the control channel message schedules resources for a second carrier. For example, the per resource set offset determination processor 524 may determine a CCE or (Lx-CCE) offset for each control channel message type (e.g. DCI format type) with a set of resources at step 430 and determine each set of resources (for example, PDCCH candidates) location in each communication device specific search space for each of its DCI format types of distinct size based on the corresponding DCI format type offset, UEs identifier, subframe number or index, aggregation level (L), total number of CCEs in the subframe control region, maximum number of PDCCH candidates (hypothesis) per aggregation level or a maximum number of decoding attempts at step 440.

The base unit may associate the communication device with the set of resources and the offset of the location of the set of resources. For one embodiment, the association may occur in response to determining that the control channel is associated with a non-reference carrier and may utilize a hash of the communication device's identity (such as a radio network temporary identifier (RNTI)) and/or a slot number in a radio subframe. For another embodiment, the communication device may be associated with a set of control channel elements. For still another embodiment, the offset may correspond to a first location for aggregation level relative to a second location of the aggregation level based on the communication device.

The communication device 400 may determine the offset in response to receiving a control message or a configuration message indicating a number of carriers to be monitored by the communication device. For one embodiment, when receiving the control message, the communication device may monitor for control messages corresponding to carriers from which resources assignments are expected.

The communication device 400 may then attempt to decode the set of resources in the search space for the control channel message. For example, a per DCI format control channel blind decoding processor 525 may perform blind decodings in each set of resources (for example, PDCCH candidates) of each DCI format type of distinct size. For one embodiment, the communication device 400 may include a monitoring means for attempting to decode the set of resources. Blind decoding may occur when there is no self blocking problem regarding the extra PDCCH transmissions per subframe for the uplink and the downlink carrier aggregation DCI format type.

As shown in FIG. 5, the communication device 400 may further include a processor 526 for control channel information processing and a processor 527 for data channel processing. The communication device 400 determines control information from the decoded control channel message. For example, upon successful detection of a PDCCH, the control information is obtained and used to successfully decode the corresponding data (for example, PDSCH) transmission which, in the case of carrier aggregation, may be on a first carrier or a different additional carrier, as represented by step 460.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a base unit for transmitting control information for a communication device, the method comprising the steps of:
    generating a control channel message comprising control information associated with the communication device;
    determining that a location of a first set of resources in a search space within a control region is offset from another location of an additional set of resources in the search space, the first set of resources based on a first control channel message type for a first carrier and an identifier associated with the communication device, the additional set of resources based on an additional control channel message type for at least one additional carrier, the at least one additional carrier not including the first carrier;
    selecting a subset of resources within the determined first set of resources for transmitting the control channel message; and
    transmitting the control channel message on the selected resources in the control region on a first carrier.

2. The method of claim 1,
    wherein the first set of resources and the additional set of resources do not entirely overlap.

3. The method of claim 1, wherein the first set of resources and the additional set of resources do not overlap.

4. A method in a communication device for determining control information, the method comprising the steps of:
    receiving a control channel message associated with the communication device in a control region on a first carrier from a base unit;
    determining that a location of a first set of resources in a search space within the control region is offset from another location of an additional set of resources in the search space, the first set of resources based on a first control channel message type for a first carrier and an identifier associated with the communication device, the additional set of resources based on an additional control channel message type for at least one additional carrier, the at least one additional carrier not including the first carrier;
    attempting to decode the first set of resources in the search space for the control channel message; and
    determining control information from the decoded control channel message.

5. The method of claim 4, wherein the first control channel message type of the control channel message is a first Downlink Control Information (DCI) format.

6. The method of claim 4, wherein the additional control channel message type of the control channel message is an additional Downlink Control Information (DCI) format.

7. The method of claim 4, wherein:
    the offset corresponds to a first offset when the control information in the control channel message schedules resources for the first carrier; and
    the offset corresponds to a second offset when the control information in the control channel message schedules resources for the additional carrier.

8. The method of claim 4, wherein determining the first set of resources in the search space includes determining a set of candidate Control Channel Elements (CCEs) corresponding to a set of candidate Physical Downlink Control Channels (PDCCH) in the search space.

9. The method of claim 4, wherein the control channel message is a Physical Downlink Control Channels (PDCCH) message.

10. The method of claim 4, wherein the search space within the control region is associated with a Control Channel Element (CCE) aggregation level.

11. The method of claim 4, further comprising determining the first set of resources in the search space based on one or more of a subframe index, a Control Channel Element (CCE) aggregation level, a total number of CCEs in the control region, or a maximum number of blind decoding attempts.

12. The method of claim 4, wherein the identifier of the communication device is a radio network temporary identifier.

13. The method of claim 4, further comprising, receiving from the base unit, a configuration message indicating a number of carriers to be monitored by the communication device.

14. The method of claim 4,
    wherein the first set of resources and the additional set of resources do not entirely overlap.

15. The method of claim 4, wherein the first set of resources and the additional set of resources do not overlap.

16. A communication device for determining control information comprising:
    a transceiver for receiving a control channel message associated with the communication device in a control region on a first carrier from a base unit; and
    at least one processor for:
        determining that a location of a first set of resources in a search space within the control region is offset from another location of an additional set of resources in the search space, the first set of resources based on a first control channel message type for a first carrier and an identifier associated with the communication device, the additional set of resources based on an additional control channel message type for at least one additional carrier, the at least one additional carrier not including the first carrier;
        attempting to decode the first set of resources in the search space for the control channel message; and
        determining control information from the decoded control channel message.

17. The communication device of claim 16, wherein:
    the offset corresponds to a first offset when the control information in the control channel message schedules resources for the first carrier; and
    the offset corresponds to a second offset when the control information in the control channel message schedules resources for the additional carrier.

18. The communication device of claim 16, wherein the control channel message is a Physical Downlink Control Channels (PDCCH) message.

19. The communication device of claim 16, wherein the search space within the control region is associated with a Control Channel Element (CCE) aggregation level.

20. The communication device of claim 16, wherein the at least one processor determines the first set of resources in the search space based on one or more of a subframe index, a Control Channel Element (CCE) aggregation level, a total number of CCEs in the control region, or a maximum number of blind decoding attempts.

21. The communication device of claim 16, wherein the identifier of the communication device is a radio network temporary identifier.

22. The communication device of claim 16, wherein the transceiver receives from the base unit, a configuration message indicating a number of carriers to be monitored by the communication device.

23. The communication device of claim 16, wherein the first set of resources and the additional set of resources do not overlap.

24. The communication device of claim 16, wherein the first set of resources and the additional set of resources do not entirely overlap.

* * * * *